(12) United States Patent
Keeth et al.

(10) Patent No.: US 6,605,970 B1
(45) Date of Patent: Aug. 12, 2003

(54) METHOD AND APPARATUS FOR CROSSING FROM AN UNSTABLE TO A STABLE CLOCK DOMAIN IN A MEMORY DEVICE

(75) Inventors: Brent Keeth, Boise, ID (US); Brian Johnson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/569,047

(22) Filed: May 10, 2000

(51) Int. Cl.[7] .................................................. G06F 1/06
(52) U.S. Cl. ........................ 327/159; 327/158; 327/233; 365/233
(58) Field of Search ................................ 327/158, 156, 327/261, 237, 233, 159; 365/233, 189.07

(56) References Cited

U.S. PATENT DOCUMENTS 5,926,053 A * 7/1999 McDermott et al. ........ 327/159
6,173,432 B1 * 1/2001 Harrison ..................... 327/158

* cited by examiner

Primary Examiner—Dinh T. Le
(74) Attorney, Agent, or Firm—Dickstein Shapiro Morin & Oshinsky LLP (57) ABSTRACT

Disclosed is a method and apparatus for converting an unstable receiver enable signal RXEN, which is based on a master clock which undergoes timing adjustments, to a stable receiver enable signal RXEN' which is based on an externally applied clock signal. An externally applied clock signal at a frequency fc is divided by a factor N to produce N uniformly phase spaced clock signals. A clocking edge of a master clock signal which generates the receiver enable signal RXEN is associated with one of the N clocking signals which has a pulse which substantially envelopes the edge of the master clock signal which generates the RXEN signal. A new receiver enable signal RXEN' is generated by the associated new clock signal. The receiver enable signal RXEN is therefore converted from a signal which has adjusted timing to RXEN' which has no timing adjustment.

123 Claims, 7 Drawing Sheets

METHOD AND APPARATUS FOR CROSSING FROM AN UNSTABLE TO A STABLE CLOCK DOMAIN IN A MEMORY DEVICE

FIELD OF THE INVENTION

The present invention relates to digital circuits, particularly to digital circuits employed in memory devices in which an unstable clock signal, used to time certain memory operations, is transferred into a stable clock domain.

BACKGROUND DISCUSSION

Figure 1:
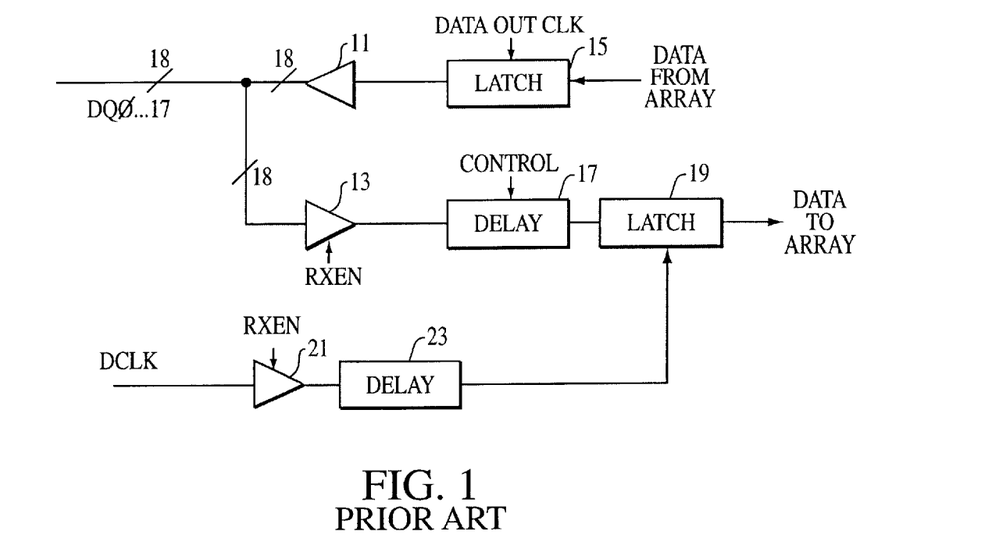
FIG. 1 illustrates a typical input data path of a memory device for both data and a data clock signal DCLK.

It is well known to use an internal master clock signal MCLK in memory devices to time many internal operations which must be performed by the memory device. One of these operations is the enabling of entry data and data clock paths into the memory device. FIG. 1 illustrates the input paths for the data DQ and data clock DCLK signals. As illustrated, the data signal paths DQø . . . DQ17 of a memory device are connected to respective receiver circuits 13 which are enabled by an applied signal RXEN. When the data signals are gated through receiver 13 by the signal RXEN, they pass through an adjustable delay device 17, and then into respective latches 19. The data applied to latches 19 are clocked into the memory device by the externally applied data clock signal DCLK. The latter signal is gated by and passes through receiver 21 when it is enabled by the receiver enable signal RXEN.

The DCLK signal, after passing through receiver 21 and delay 23, is applied to the latches 19 to latch the data on the data paths DQø . . . DQ17. The data paths also include an output circuit for the memory device which includes output latch 15 which receives a clock signal for clocking data out of the memory device and a buffer 11 which applies the output data onto the respective data paths DQø . . . DQ17.

The receiver enable signal RXEN must be received at the receivers 13 and 21 prior to the time that the respective data signals, for receiver 13, and DCLK signal for receiver 21, are received The RXEN signal in turn is generated internally from a master clock signal MCLK which controls all of the internal operations of a memory device. The RXEN signal is generated upon receipt at the memory device of a WRITE command and in response to the next received edge of the MCLK signal. In order to properly control many of the internal operations of the memory device, the timing of the master clock signal MCLK is typically adjusted in response to temperature and/or voltage variations within the memory device. This in turn affects the timing of the generation of the signal RXEN.

Figure 4:
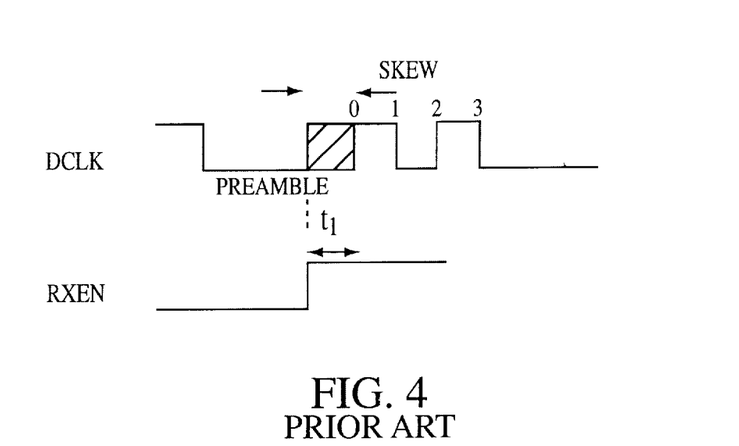
FIG. 4 illustrates the timing and relationship between a prior art receiver enable signal RXEN and a received data clock signal DCLK.

FIG. 4 illustrates the typical relationship between an arriving DCLK signal and the RXEN signal. As shown, the RXEN signal should occur during a preamble portion of the DCLK signal before the first clock transition "0" which is used to latch in data on the data paths DQø . . . DQ17 and before a certain additional period of time shown by the crosshatching in FIG. 4, which accommodates signal skew within the memory device. Thus, the receiver enable signal RXEN must occur before a period of time denoted as $t_1$ in FIG. 4.

In cases of large variations in the timing of MCLK, there will also be corresponding large variations in the timing of the receiver enable signal RXEN as shown by the double headed arrow in FIG. 4. It is possible in such cases that the RXEN signal is not generated sufficiently in advance of the time $t_1$ which may cause clocking transitions 0, 1, 2, 3 of DCLK to be incorrectly applied to the latch 19 relative to the data incoming on the data paths DQø . . . DQ17. This may cause improper operation of the memory device. It would be preferable if the RXEN signal were not subject to the timing variations which occur with signal MCLK.

SUMMARY OF THE INVENTION

The present invention provides a memory device and its method of operation in which the RXEN signal does not vary in response to variations in the signal MCLK. Instead, a clock edge of the MCLK signal which is used to generate the RXEN signal is associated with a clock signal which is derived from an externally received clock signal related to DCLK. The association is such that an edge of the MCLK signal which is used to generate the RXEN signal is placed at approximately the center of a pulse of the clock signal derived from the externally applied clock signal. The clock signal derived from the externally applied signal is then used to generate a new RXEN' signal. Since the signal derived from the externally applied signal is always stable and does not move with variations in voltage and/or temperature as does the signal MCLK or the prior signal RXEN, the timing of the newly generated receiver enable signal is also stable and does not move in response to variations in voltage and/or temperature.

BRIEF DESCRIPTION OF THE DRAWINGS

The above described advantages and features of the invention, as well as others, will be better understood from the following detailed description of the invention which provided in connection with the accompanying drawings in which.

DETAILED DESCRIPTION OF THE PREFERRED EMBODIMENTS

The present invention provides respective enable signals RXEN' and RXEN" for the receivers 13 and 21 illustrated in FIG. 1. The RXEN' and RXEN" signals for receivers 13 and 21 are derived by using the unstable receiver enable signal RXEN to generate stable receiver enable RXEN' and RXEN" signals which are keyed to an externally applied clock signal, the latter of which remains stable, even with variations in temperature and/or voltage of the memory device.

Figure 2:
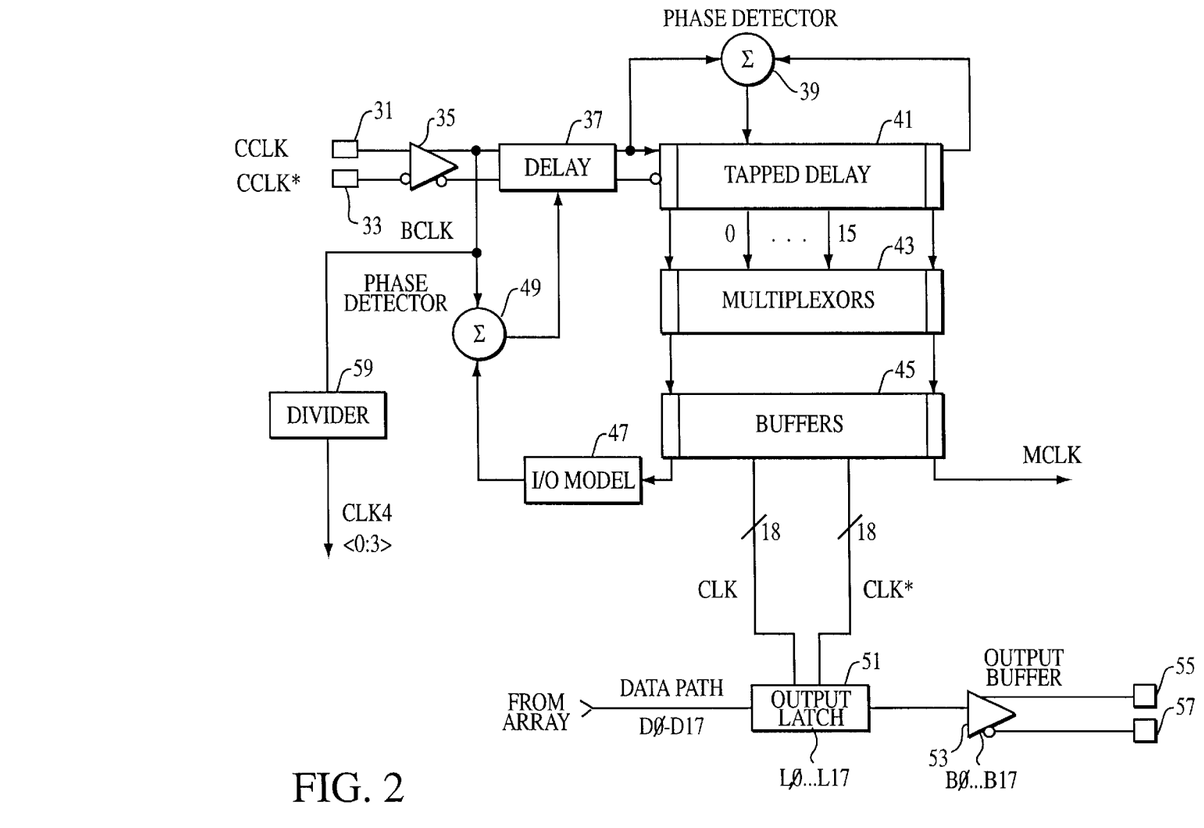
FIG. 2 illustrates a memory device circuit for generating an MCLK signal.

In order to understand the invention, the manner in which the master clock signal MCLK is conventionally derived in a memory device is illustrated with respect to FIG. 2. FIG. 2 shows a circuit for deriving various clock signals used in the operation of a memory device. External clock signals CCLK and CCLK* are received at terminals 31 and 33 and provided through a buffer 35 to an adjustable delay circuit 37, the output of which feeds the delayed CCLIK and CCLIK* signals into a tapped delay to line 41.

The tapped delay line 41 has a plurality of taps which provide delayed clock signals 0 . . . 15 to multiplexers 43 which are capable of providing selected ones of the clock signals 0 . . . 15 to selected ones of buffers 45. The buffers 45 in turn supply respective delayed clock signals CCLK and CCLK* to respective output latches 51 of data paths Dø . . . D17 of a memory device. The output latches 51 in turn supply read data from a memory array to respective output buffers 53 and output terminals 55 and 57.

One of the delayed signals from tapped delay line 41, for example, one provided at the last stage of the tapped delay line 41, is provided to multiplexer 43 in a manner in which the signal passes through the multiplexer without being switchable to a selected buffer 45. This signal which passes through multiplexor 43 and through buffer 45 is the master clock signal MCLK which is used to time various operations within a memory device.

Another clock output signal, for example, at the beginning of tapped delay line 41 (tap 0), is also provided as a clock signal which passes straight through multiplexer 43 and buffer 45 as an input to input/output model circuit 47. The input/output model circuit 47 is a circuit which is designed to provide a specific delay to the signals CCLK and CCLK* through adjustable delay circuit 37 in accordance with designed operating parameters of the memory device and in response to changes in operating voltage and/or temperature of the device. To this end, the clock signal at tap 0 supplied to input/output model circuit 47, and after being adjusted based on the parameters of voltage and temperature, is provided as an input into phase detector 49 which receives at another input the clock signal CCLK, also relabeled BCLK (buffered clock). The output of the phase detector 49 is used to adjust the delay circuit 37 to attain a desired timing relationship of the clock signal CCLK in accordance with voltage and temperature variations experienced by the memory device.

FIG. 2 also illustrates a phase detector 39 which is used to adjust the length of the tapped delay line 41 such that it remains at a constant length, such as one clock cycle. Phase detector 39 operates by comparing the output to the input of the tapped delay line 41 and making the necessary adjustments thereto to ensure that the delay length remains stable.

As is evident from FIG. 2, the adjustable delay circuit 37 causes timing adjustments in the input signal to the tapped delay line 41, which in turn cause like timing adjustments in the MCLK signal.

Figure 3:
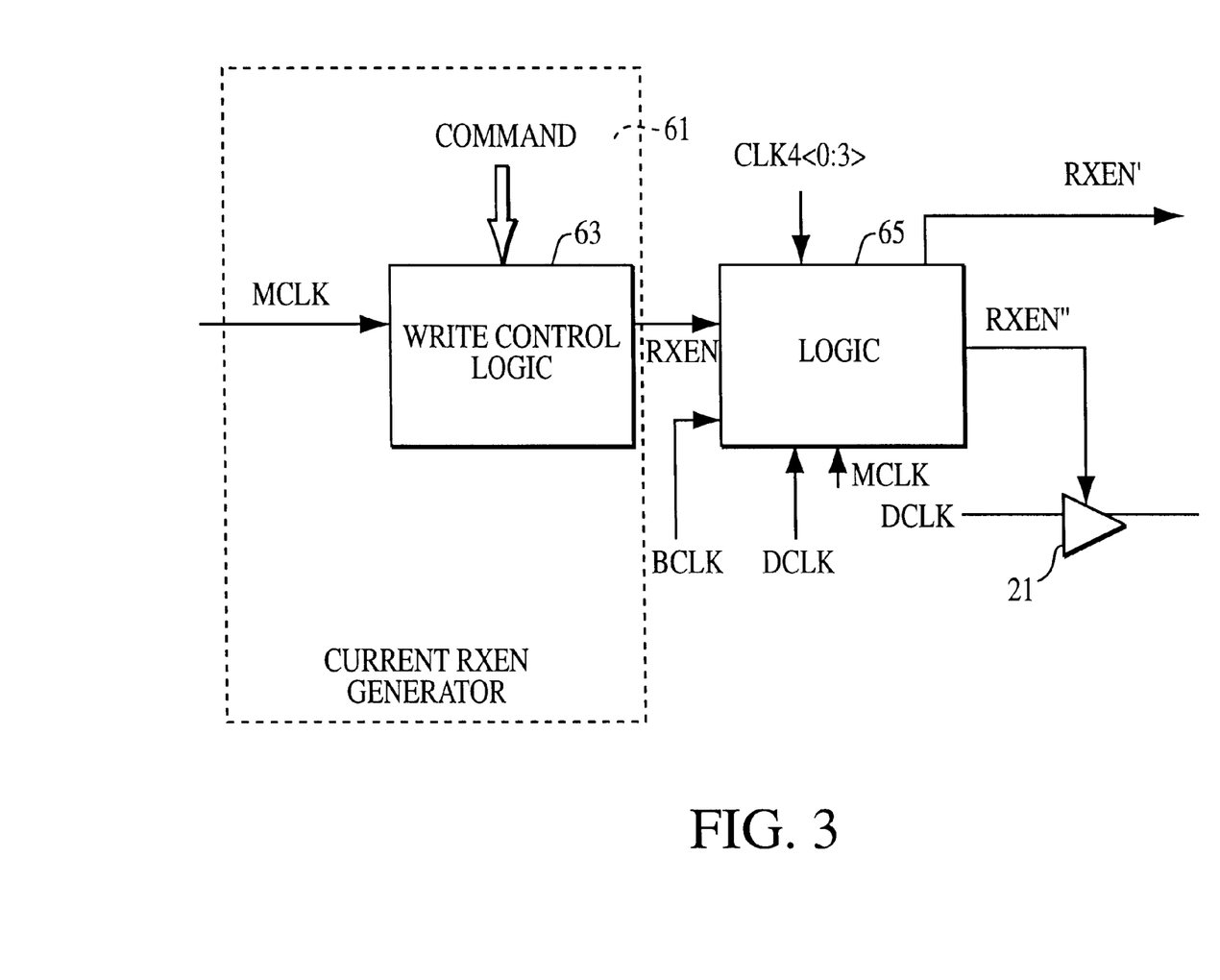
FIG. 3 illustrates a conventional RXEN signal produced by a MCLK signal, as well as new receiver enable signal RXEN' produced in accordance with the invention.

FIG. 3 illustrates how a conventional circuit uses the MCLK signal to generate a receiver enable signal RXEN. In a conventional memory device, a RXEN generator 61 is provided which contains control logic circuit 63. The control logic circuit 63 is responsive to a WRITE command to generate, on the next occurrence of the MCLK clock signal, the receiver enable signal RXEN. In a conventional memory device this RXEN signal is used in the manner illustrated in FIG. 1 to operate receivers 13 and 21 to respectively gate in data and the data clock signal DCLK.

However, as noted earlier, the RXEN signal is an unstable signal in that its timing varies in accordance with time adjustments made to the MCLK signal by virtue of the variable delay circuit 37.

The present invention converts the unstable receive enable signal RXEN to a pair of stable enable signals denoted RXEN' and RXEN", which respectively operate the data receiver 13 and receiver 21 in FIG. 1. The receiver enable signals RXEN' and RXEN" can be seen as output signals in the circuit of FIG. 8. However, before describing exemplary circuitry for implementing the invention, the overall operation of the invention will be illustrated with respect to the timing diagrams shown in FIGS. 5 and 6.

Figure 5:
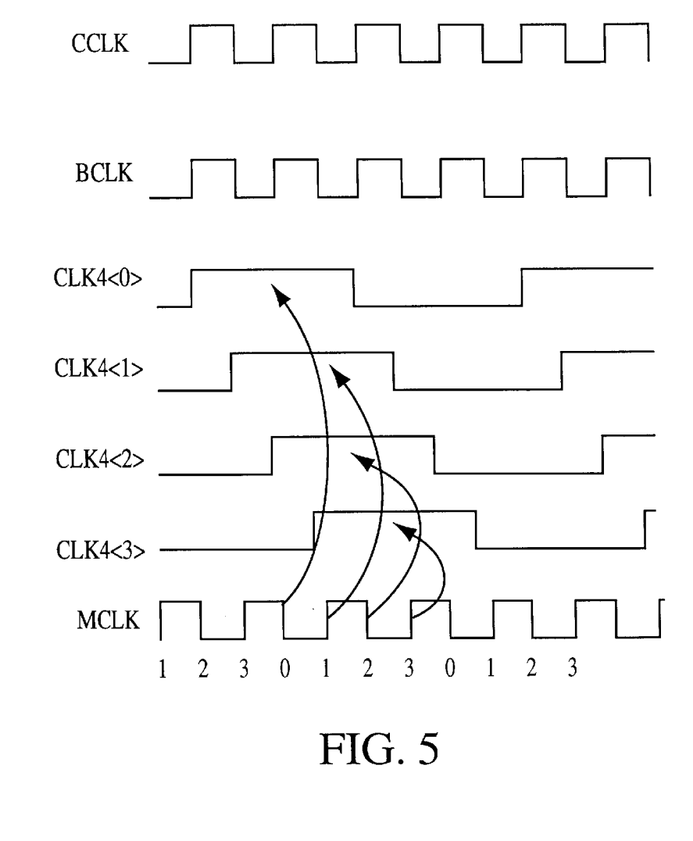
FIG. 5 is a timing diagram illustrating the operation of a portion of the invention.

FIG. 5 illustrates the timing relationship between an externally received clock signal CCLK, and an internally generated clock signal BCLK which is generated at the output of the buffer amplifier 35 shown in FIG. 2. The signal BCLK is supplied to a frequency divider circuit 59 in FIG. 2 which generates four frequency divided clock signals CLK 4 <0:3>. These latter signals are also illustrated in FIG. 5 as CLK 4 <0> CLK 4 <1>, CLK 4 <2> and CLK 4 <3>. In addition, frequency divider 59 also provides the CLK 4 <0:3> clock signals with phase offset from one another of one-half of a BCLK signal clock cycle. FIG. 5 also illustrates the MCLK clock signal with rising and falling transitional edges 0, 1, 2, 3, 0, etc. Since data acquisition in an exemplary memory device containing the invention occurs on four successive clock edges, the labeling of the transitional edges of the MCLK signal is from 0 through 3.

In operation, the invention associates each of the rising and falling 0 . . . 3 edges of the MCLK signal with one of the frequency divided clock signals CLK 4. The association is made by associating one edge of the MCLK clock signal with one of the clock signals CLK 4 <0:3> which more closely has the MCLK clock edge positioned at a substantial central point of the pulse width of the CLK 4 signal.

As shown in FIG. 5, each of the clock edges 0, 1, 2, 3 of the MCLK clock signal is associated with a corresponding one of the CLK 4 clock signals. Thus, the MCLK signal edge 0 is associated with the CILK 4 <0> signal; the MCLK signal edge 1 is associated with the CLK 4 <1> signal; the MCLK signal edge 2 is associated with the CLK 4 <2> signal; and the MCLK signal edge 3 is associated with the CLK 4 <3> signal.

It should be noted that although FIG. 5 illustrates MCLK clock signal edges 0, 1, 2, 3 respectively associated with the CLK 4 <0>, CLK 4 <1>, CLK 4 <2>, and CLK 4 <3> signals, the MCLK clock edges need not map to the CLK 4 clock signals in this precise order. Again, an edge of the MCLIK signal is associated with that one of the CLK 4 signals where the edge is closest to the center of the pulse forming the CLK 4 signal. Also, although the invention is illustrated with four transitions of the MCLK signal 0 . . . 3 and four associated clock signals CLK 4 <0:3>, the number of transitions 0 . . . 3 of MCLK and associated number of clock signals can vary in accordance with circuit design.

Figure 6:
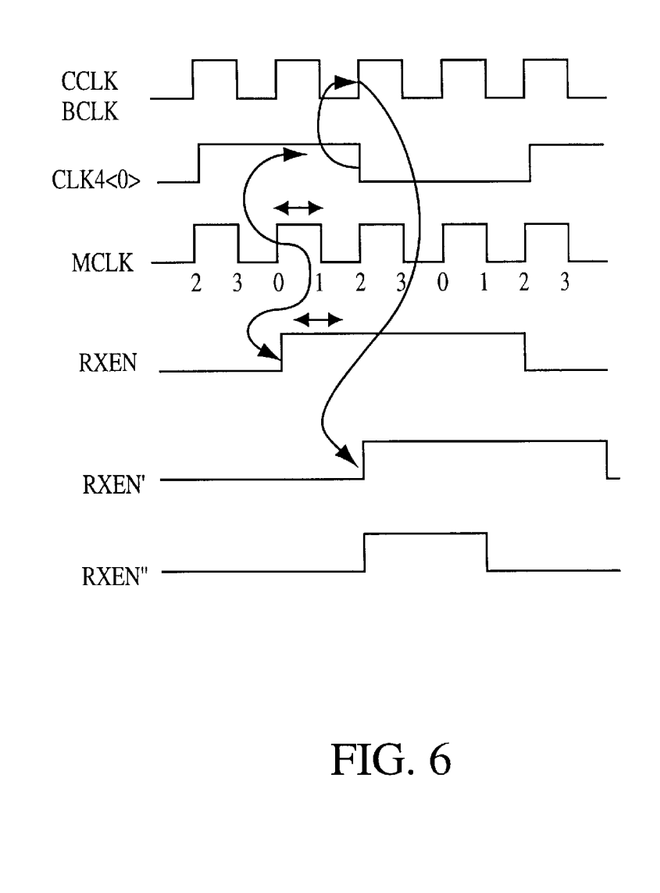
FIG. 6 is a timing diagram illustrating the operation of another portion of the invention.

Once the MCLK clock signal edges are associated with respective ones of the CLK 4 signals, the invention then relies on the CCLK 4 clock signal associated with the edge of the MCLK signal, e.g., MCLK edge 0, which was used to generate RXEN to generate the RXEN' and RXEN" receiver enable signals. As shown in FIG. 6, the RXEN' and RXEN"

signals are generated off a next edge of the BCLK signal following the next transition of the CCLK 4 <0> signal which occurs after the MCLK, edge 0, signal which generated the RXEN signal.

Since a BCLK signal generated from a CCLK 4 signal is used for generating the receiver enable signals RXEN' and RXEN", any variations in timing of the MCLK signal or associated RXEN signal, depicted in FIG. 6 by the double headed arrow, do not affect the time at which the RXEN' and RXEN" signals are generated. This is because the CCLK 4 and BCLK signals are locked to the externally applied clock signal CCLK. Accordingly, the receiver enable signals are now tied to a signal derived from the external clock signal. This ensures that the receiver signals RXEN' and RXEN" will always be generated in a stable manner at a timing which allows receivers 13 and 21 to properly and respectively admit the data and data clock signal DCLK into the memory device.

It should be noted that although the conventional circuit illustrated in FIG. 1 used RXEN as an enable signal for both receivers 13 and 21, in the invention two receiver enable signals are provided: one RXEN' for enabling receiver 13, and the other RXEN" for enabling receiver 21. The reason for the two enable signals will become more apparent from the discussion below.

Returning to FIG. 3, the circuitry for generating and using the timing relationships illustrated in FIGS. 5 and 6 is shown as logic circuit 65. Logic circuit 65 receives a conventional RXEN signal from RXEN generator 61, the data clock DCLK signal, the clock signal BCLK and the four divided clock signals CLK 4 <0:3>, and the master clock MCLK signal to generate the respective receiver enable signals RXEN' and RXEN".

Figure 7:
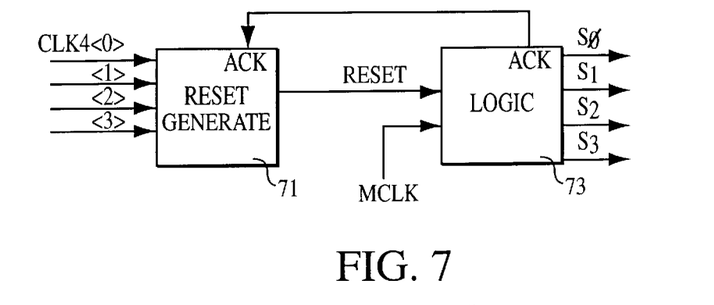
FIG. 7 is a circuit for generating timing signals used in the invention.
Figure 8:
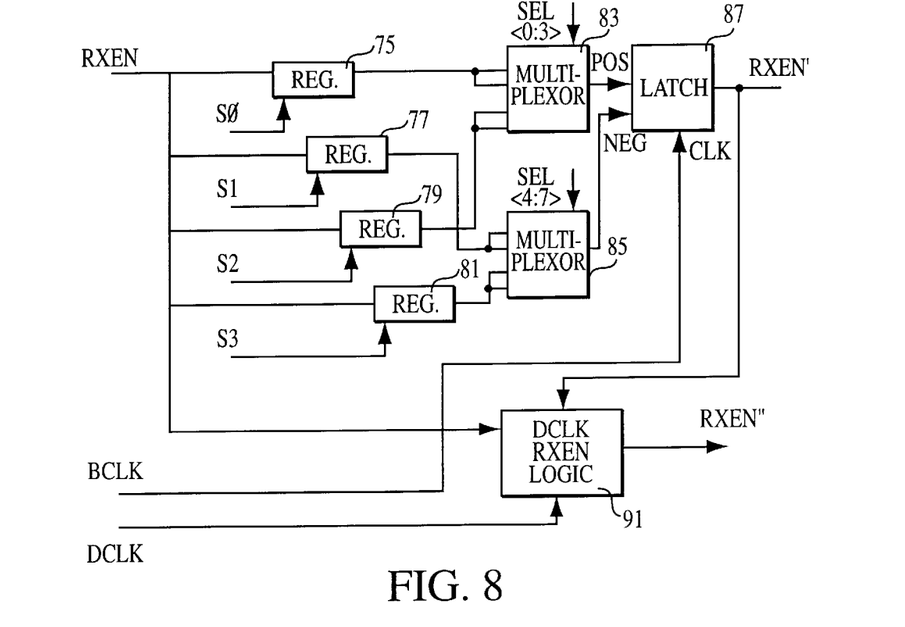
FIG. 8 is a circuit for generating a new receiver enable signal RXEN' in accordance with the invention.
Figure 9:
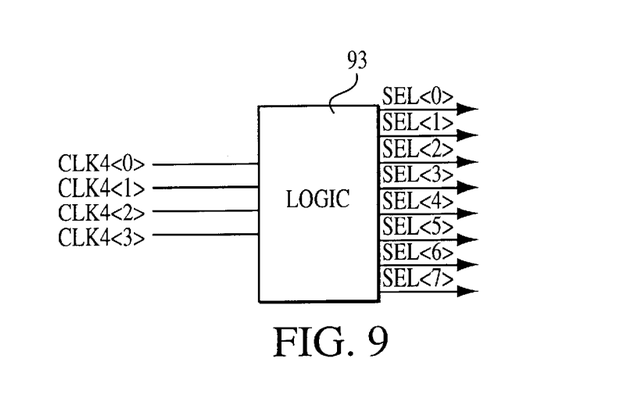
FIG. 9 is a circuit illustrating the generation of multiplex selection signals in accordance with the invention.

The details of logic circuit 65 are illustrated in FIGS. 7, 8 and 9.

FIG. 7 illustrates a circuit which is utilized to identify the successive clock edges 0, 1, 2, 3 of the master clock signal MCLK. It includes a reset generator 71 and a logic circuit 73. The output of logic circuit 73 are respective signals Sø, S1, S2, S3 which are respectively generated in response to the MCLK clock signal edges 0, 1, 2, 3. Logic circuit 73 contains a counter and there is an arbitrary relationship at initialization of the counter between the edges of incoming clock signal MCLK and the output signals Sø, S1, S2, S3.

In order to associate a clock edge of the MCLK signal with a particular one of the CLK 4 <0:3> signals, reset generator 71 is provided. The reset generator receives each of the CLK 4 <0:3> signals and, when a predetermined logic state relationship exists among the four clock signals CLK 4 <0:3>, a reset signal is generated to logic circuit 73, which causes a resetting of the counter so that the next edge of the MCLK signal will generate an output So the second edge will generate the output signal S1; the third edge will generate the output signal S2; and the fourth edge will generate the output signal S3 in a repeating sequence.

After resetting has occurred, logic circuit 73 will provide an acknowledgment signal back to reset generator 71 to prevent generator 71 from generating any further reset signals. As a consequence, logic circuit 73 will continue to supply successive repeating output signals Sø . . . S3 as the successive edges 0, 1, 2, 3 . . . of the MCLK clock signal are continually counted.

Figure 11:
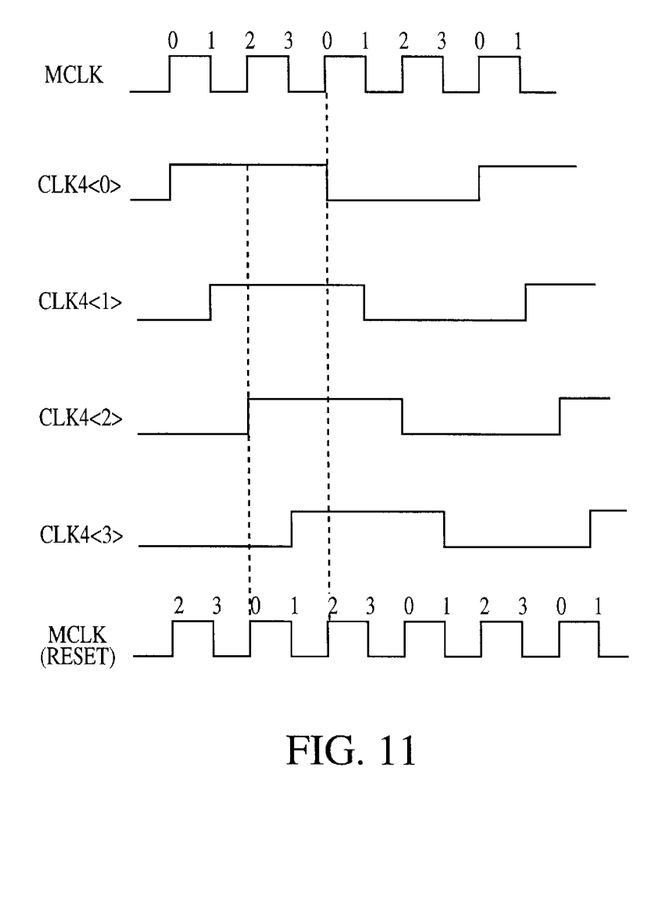
FIG. 11 is a timing diagram illustrating the operation of the FIG. 7 circuit.

FIG. 11 illustrates the timing diagram of the operation of the FIG. 7 circuit. Originally the MCLK clock signal has arbitrarily assigned clock edges as illustrated at the top of FIG. 11. When the reset generator 71 recognizes a predetermined pattern in the applied CLK 4 <0:> clock signals, e.g., 1110 as illustrated in FIG. 11, it causes a resetting of the master clock counter within logic circuit 73 so that the next MCLK clock pulse is now counted as the first clock edge MCLK0. Thus, as shown at the bottom of FIG. 11, the MCLK clock signal has now been realigned so that the MCLK clock 0 signal is substantially at the center of the pulse of the CLK 4 <0> signal; the MCLK 1 edge is substantially at the center of the CLK 4 <1> signal; the MCLK 2 edge is substantially at the center of the CLK 4 <2> signal; and the MCLK 3 edge is substantially at the center of the CLK 4 <4> signal.

The association of a particular MCLK clock edge to a particular one of the CLK 4 <0:3> signals, as shown in FIG. 11, results in the output signals Sø . . . S3 from logic circuit 73 respectively identifying the first, second third and fourth edges as realigned and associated with respective one of the CLK 4 <0:3> signals.

The manner in which the RXEN' and RXEN" signals are generated will now be described with reference to FIGS. 8 and 9.

FIG. 8 illustrates the receiver enable RXEN signal, wich is generated from one of the MCLK clock signal edges 0 . . . 3, applied to respective one bit registers 75, 77, 79 and 81. Each of these registers respectively receives, as a latching signal, one of the signals Sø . . . S3 denoting a respective edge of the MCLK signal. The output of registers 75 and 79 are applied as inputs to a multiplexer 83, while the outputs of the registers 77 and 81 are applied as inputs to multiplexer 85. Multiplexer 83 also receives selection signals Sel<0>, Sel<1>, Sel<2> and Sel<3>, whereas multiplexer 85 receives selection signals Sel<4>, Sel<5>, Sel<6>, and Sel<7>. The selection signals are generated by the logic circuit 93 illustrated at FIG. 9.

Logic circuit 93 receives each of the four CLK 4 <0:3> clock signals. The CLK 4 <0:3> signals are capable of indicating eight different binary states, with each of these binary states being used to generate one of the selection signals Sel<0> . . . Sel<7>.

Returning to FIG. 8, each of the registers 75, 77, 79 and 81 is loaded with the RXEN signal when a respective latch signal Sø . . . S3 is applied to the register. Thus, when the RXEN signal is generated and is applied to the registers 75, 77, 79 and 81, one of the registers will be loaded with the RXEN signal before the others. This register will be latched by the edge of the MCLK signal as represented by one of Sø, S1, S2, or S3 which generated the receiver enable RXEN signal in RXEN generator 61.

The register which first receives the RXEN signal is then coupled by one of multiplexers 83 or 85 in response to the selection signals Sel<0:7> to an input of latch 87. Latch 87 is provided with a positive input and a negative input. The positive and negative inputs respectively cause the latch 87 to latch in response to a positive going or negative going edge of an applied clock signal BCLK, which is the same clock signal in FIG. 2 at the output of buffer 35.

Accordingly, that register 75, 77, 79 or 81 which first receives the RXEN signal, identifies that clock edge 0, 1, 2, 3 of the MCLK clock signal which was used to generate the RXEN signal. Multiplexer 83 will pass any positive going edge of the clock signal used to generate the RXEN signal to latch 87, while multiplexer 85 will pass any negative going edge of the MCLK clock signal used to generate RXEN to latch 87. Latch 87 will therefore latch in response to the next positive or negative going edge of BCLK and provide an output signal RXEN' as selected by either the positive or negative input to latch 87.

The output signal RXEN' then becomes a new receiver enable signal, which is now applied to receiver 13 for the data path DQø . . . DQ17 receivers. In addition, the RXEN' signal is applied to another logic circuit 91 which is used to generate the RXEN" signal, which is applied to receiver 21 in FIG. 1.

Logic circuit 91 receives the DCLK clock signal which is used to terminate the generation of the RXEN" signal as soon as the DCLK clock signal finishes a data burst signal. Returning to FIG. 4, a data write burst DCLK signal includes a preamble portion and then four clock edges denoted 0, 1, 2, 3. When the third clock edge DCLK 3 finishes, this is sensed by the RXEN" logic circuit 91, which then terminates the RXEN" signal. Thus, the receiver enable signal RXEN' will remain on somewhat longer than the RXEN" receiver enable signal. Logic circuit 91 also receives the RXEN signal as an enable signal.

Figure 10:
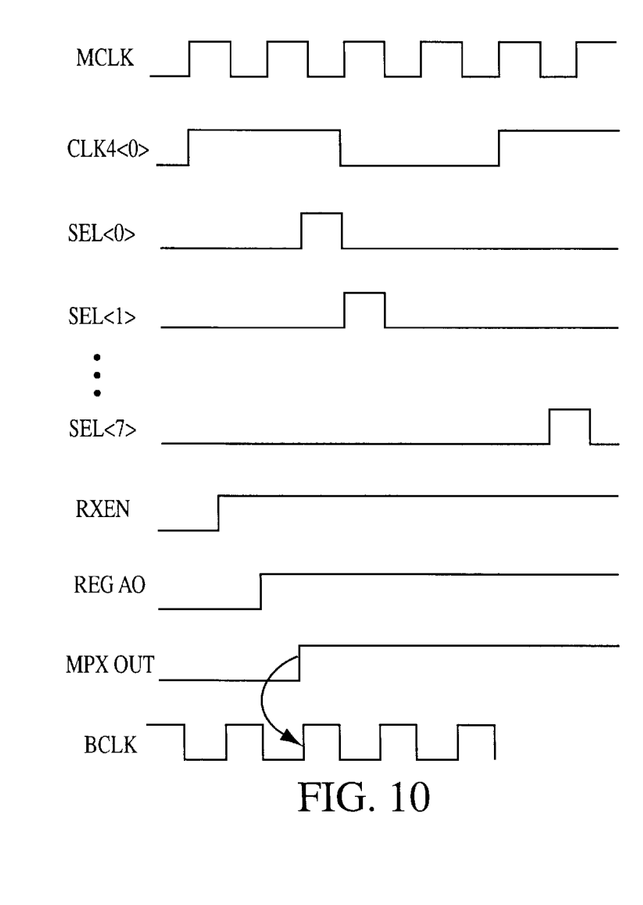
FIG. 10 is a timing diagram illustrating the operation of the FIG. 8 circuit.

An exemplary operation of the FIG. 8 circuit is illustrated by the timing diagrams of FIG. 10. The relationship of the clocking signal edges of the realigned master clock MCLK to the associated CLK 4 <0> signal is illustrated by the top two timing diagrams. Respective selection signals Sel<0> . . . Sel<7> are further illustrated. These are the signals generated by logic circuit 93 of FIG. 9. The RXEN signal generated by logic circuit 61 of FIG. 3 is also illustrated. If we assume that register stage A0 is the first stage to receive the RXEN signal, that is register 75 first receives the RXEN signal, then the multiplexer 83 in response to selection signal Sel<0> will generate an output on the positive input to latch 87. This will cause latch 87 to produce RXEN' in response to the next positive going input of the BCLK clock signal, which is also illustrated in FIG. 10. The RXEN' signal at the output of the latch 87 is also applied as an input to the logic 91 which generates RXEN" receiver enable signal.

As demonstrated above, the invention converts an unstable receiver enable signal RXEN into stable signals RXEN' and RXEN" which are keyed to a stable externally applied clock signal CCLK. Accordingly, the receiver enable signals respectively applied to receivers 13 and 21 will stably receive write data on the data paths and the data clocking signal DCLK without regard to timing changes in the MCLK signal or associated receiver enable signal RXEN. The invention therefore provides a reliable entry of data into the memory array no matter what the voltage and temperature characteristics of the memory device, which are otherwise used to compensate the timing of the master clock signal MCLK.

Figure 12:
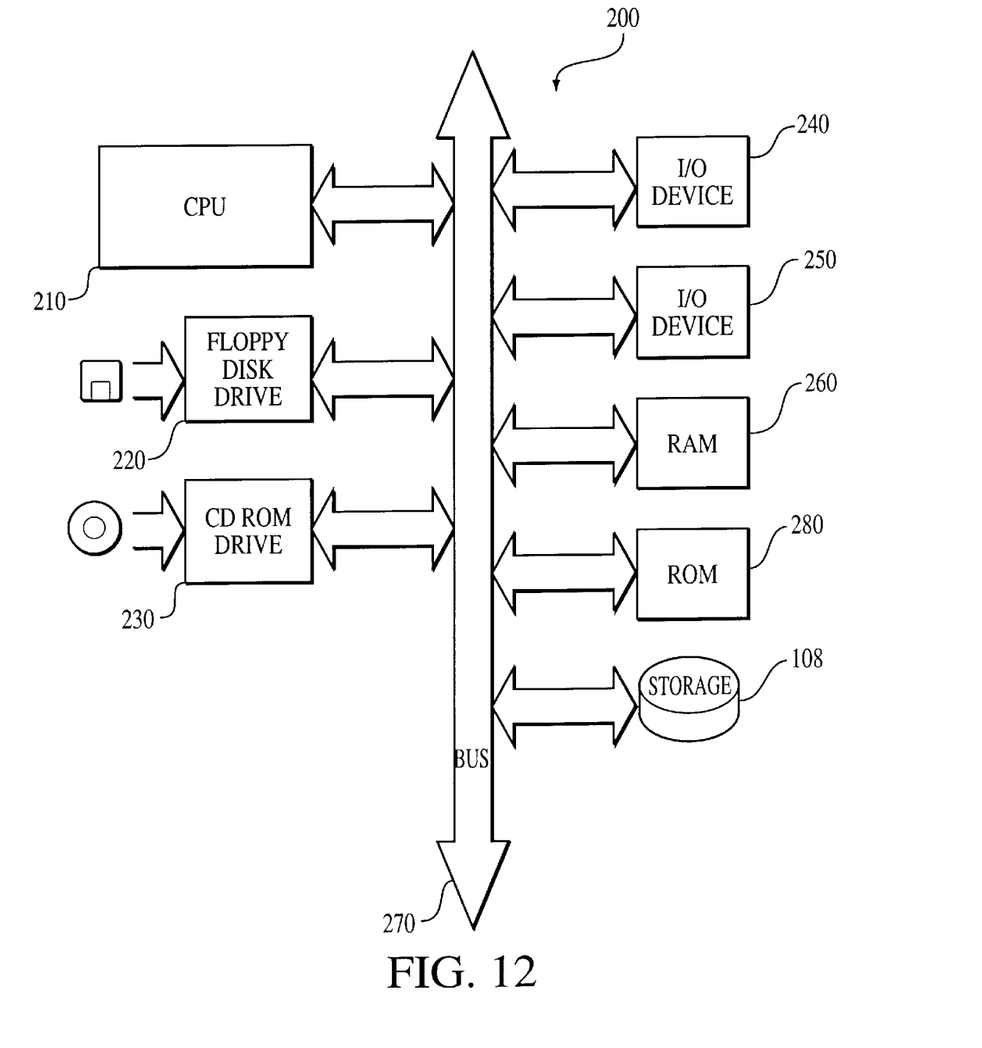
FIG. 12 is a block diagram of an exemplary processor system in which the invention may be used.

The invention may be used in a processor system. As shown in FIG. 12, a processor system, such as a computer system, for example, generally comprises a central processing unit (CPU) 210, for example, a microprocessor, that communicates with one or more input/output (I/O) devices 240, 250 over a bus 270. The computer system 200 also includes random access memory (RAM) 260, a read only memory (ROM) 280 and may include peripheral devices such as a floppy disk drive 220 and a compact disk (CD) ROM drive 230 which also communicate with CPU 230 over the bus 270. At least RAM 260 is formed of one or more integrated circuit memory devices which contain the invention as described above with reference to FIGS. 3 and 5 through 11.

While the invention has been described and illustrated with respect to exemplary embodiments, it should be apparent that many modifications and substitutions may be made without departing from the spirit and scope of the invention. Accordingly, the invention is not to be considered as limited by the foregoing description, but is only limited by the scope of the appended claims.

What is claimed as new and desired to be protected by Letters Patent of the United States is:

1. A method of operating a memory device comprising:
   generating a first internal clock signal from a first external clock signal having a frequency fc;
   generating a first control signal from a clock edge of said first internal clock signal;
   generating N second clock signals from said first external clock signal, each of said N second clock signals having a frequency of fc/N and being phase shifted relative to each other, where N> 1;
   associating a plurality of successive edges of said first internal clock signal with respective ones of said N clock signals;
   determining which one of said N second clock signals is associated with the clock edge of said first internal clock signal used to generate said first control signal; and
   generating a first receiver enable signal from said determined one of said second clock signals.

2. A method as in claim 1 wherein N=4.

3. A method as in claim 1 further comprising using said first receiver enable signal to enable reception of a data on data paths into said memory device.

4. A method as in claim 3 further comprising generating a second receiver enable signal from said determined one of said clock signals and using said second receiver enable signal to enable reception of a second external clock signal into said memory device.

5. A method as in claim 1 wherein the timing of said first internal clock signal varies in response to changes in at least one predetermined parameter.

6. A method as in claim 5 wherein the timing of said first internal clock signal varies in accordance with voltage variations.

7. A method as in claim 5 wherein the timing of said first internal clock signal varies in accordance with temperature variations.

8. A method as in claim 1 wherein each of said N second clock signals is phase shifted from an adjacent one of said N second clock signals by one half of a cycle of said external clock signal.

9. A method as in claim 1 wherein said first receiver enable signal is generated from an edge of said determined one of said second clock signals.

10. A method as in claim 1 wherein said association provides each of successive edges of said first internal clock signal within the period of a pulse of a respective one of said N clock signals.

11. A method as in claim 10 wherein said association provides each of said successive edges at or near the center of said respective pulses of said respective N clock signals.

12. A method as in claim 4 wherein said first and second receiver enable signals are pulse signals which are not coextensive.

13. A method of operating a memory device comprising:
   receiving a first external clock signal and using said external clock signal to latch incoming data on a data path;
   receiving a second external clock signal and generating a master clock signal therefrom;
   using said master clock signal to generate a control signal; and
   enabling a receiver which receives said first external clock signal with a first enable signal which is derived from said control signal, a plurality of clock signals derived from said second external clock signal, said master clock signal and said first and second external clock signals.

14. A method as in claim 13 further comprising:
adjusting the timing of said master clock signal in response to at least one parameter; and
frequency dividing said second external clock signal to produce said plurality of clock signals.

15. A method as in claim 14 wherein the timing of said first enable signal does not change with timing adjustments made in said master clock signal.

16. A method of operating a memory device comprising:
generating a master clock signal from a first external clock signal;
generating a plurality of second clock signals from said first external clock signal, said plurality of second clock signals being phase shifted from one another;
generating a first enable signal with an edge of said master clock signal;
associating said edge of said master clock signal which generated said first enable signal with one of said plurality of second clock signals which has a clock pulse which envelopes said edge;
using an edge of said clock pulse of said one second clock signal to generate a second enable signal; and
using said second enable signal to enable a receiver which receives a second external signal.

17. A method as in claim 16 wherein said second enable signal is used to enable a receiver in a data input path of said memory device.

18. A method as in claim 16 wherein said second enable signal is used to enable a receiver in a data clock input path of said memory device.

19. A method as in claim 16 wherein said associating places said master clock signal edge at or near the center of said enveloping clock pulse.

20. A method as in claim 16 further comprising adjusting the timing of said master clock pulse signal in accordance with changes in at least one predetermined parameter.

21. A method as in claim 20 wherein said parameter is an operating voltage parameter.

22. A method as in claim 21 wherein said parameter is a temperature parameter.

23. A method as in claim 16 wherein said association comprises:
counting signal transitions of said master clock signal;
identifying each of said counted transitions; and
resetting the counting and identification of said signal transitions of said master clock when a predetermined signal relationship exists among said plurality of said second clock signals.

24. A method as in claim 23 wherein said counted and identified signal transitions are each successive signal transitions of said master clock.

25. A method as in claim 23 wherein said counting and identification begins again once said counting counts to a predetermined value.

26. A method as in claim 25 wherein said predetermined value is four.

27. A method as in claim 23 wherein said predetermined signal relationship occurs when a predetermined logic state exists in the signal levels of said plurality of second clock signals.

28. A method a in claim 23 wherein said association further comprises identifying the master clock signal transition which generated said first enable signal.

29. A method as in claim 28 wherein said identification of the master clock signal which generated said first enable signal comprises:
passing said first enable signal in common to a plurality of registers;
enabling said registers with respective signals identifying signal transitions of said master clock signal;
identifying that master clock transition identifying signal which enables an associated register to first receive said first enable signal as the master clock transition which generated said first enable signal.

30. A method as in claim 29 wherein said step of using an edge of said clock pulse to generate a second enable signal comprises:
generating a plurality of sequential selection signals from said plurality of second clock signals, said selection signals having a predetermined timed relationship with respect to each of said plurality of second clock signals; and
using one of said selection signals to switch the output of a register which first receives said first enable signal to a latch which latches a voltage in response to a next occurring edge of an external clock signal, as said second enable signal.

31. A method as in claim 30 wherein said act of generating comprises:
generating a plurality of sequential selection signals from four second clock signals.

32. A method as in claim 30 wherein said latch is configured to latch in response to either positive or negative going transitions of said external clock signal, said selection signals determining which of said next occurring positive or negative going transitions of said clock signal are used to operate said latch to produce said second enable signal.

33. A method as in claim 30 further comprising applying said second enable signal to a receiver for an input data path of said memory device.

34. A method as in claim 30 further comprising applying said second enable signal to a logic circuit which generates a third enable signal, and applying said third enable signal to a receiver for an input data clock path of said memory device.

35. A method as in claim 34 wherein said logic circuit receives a data clock signal on said input data clock path which controls the termination of said third enable signal.

36. A method as in claim 35 further comprising applying said first enable signal to said logic circuit as an enabling signal.

37. A memory device comprising:
a first signal generator which generates a first internal clock signal from a first external clock signal which has a frequency fc;
a second signal generator which generates a first control signal from an edge of said internal clock signal;
a third signal generator which generates N second clock signals from said first external clock signal, each of said N second clock signals having a frequency of fc/N and being phase shifted relative to each other, where N> 1; and
a logic circuit which associates a plurality of successive edges of said first internal clock signal with a respective one of said N clock signals and determines which one of said N clock signals is associated with the clock edge of said first internal clock used to generate said first control signal, said logic circuit generating a first receiver enable signal from said determined one of said N clock signals and also from said first control signal.

38. A memory device as in claim 37 wherein N=4.

39. A memory device as in claim 37 further comprising a selectively enabled receiver for receiving an external data clock signal, an enabling input of said receiver being coupled to said first receiver enable signal.

40. A memory device as in claim 37 further comprising at least one selectively enabled receiver for receiving input data for said memory device, an enabling input of said receiver being coupled to said first receiver enable signal.

41. A memory device as in claim 39 wherein said logic circuit produces a second receiver enable signal from said first receiver enable signal, said memory device comprising at least one additional selectively enabled receiver for receiving input data for said memory device, an enabling input of said additional receiver being coupled to said second receiver enable signal.

42. A memory device as in claim 41 wherein said first and second enable signals are not coextensive in time.

43. A memory device as in claim 37 wherein said first signal generator adjusts the timing of said first internal clock signal in response to changes in at least one predetermined parameter.

44. A memory device as in claim 43 wherein said first receiver enable signal is unaffected by timing adjustments made to said first internal clock signal.

45. A memory device as in claim 43 wherein said parameter is at least one operating voltage of said memory device.

46. A memory device as in claim 43 wherein said parameter is a temperature.

47. A memory device as in claim 37 wherein each of said N second clock signals is phase shifted from an adjacent one of said N second clock signals by one half of a cycle of said external clock signal.

48. A memory device as in claim 37 wherein said logic circuit generates said first receiver enable signal from an edge of said determined one of said N clock signals.

49. A memory device as in claim 37 wherein said logic circuit aligns each of successive edges of said first internal clock signal with a period of a pulse of a respective one of said N clock signals.

50. A memory device as in claim 49 wherein said logic circuit aligns each of said successive edges of said first internal clock signal to be at or near the center of said respective pulses of said respective N clock signals.

51. A memory device comprising:
a first signal generator which generates a first internal clock signal from a first external clock signal which has a frequency fc;
a second signal generator which generates a first control signal from an edge of said internal clock signal;
a third signal generator which generates N second clock signals from said first external clock signal, each of said N second clock signals having a frequency of fc/N and being phase shifted relative to each other, where N> 1;
a logic circuit responsive to said first control signal, said first external clock signal, said first internal clock signal, and said N second clock signals for associating an edge of said internal clock signal which generated said first control signal with one of said N clock signals; and
a selectively enabled receiver which is responsive to said first receiver enabling signal to permit signal input into said memory device.

52. A memory device as in claim 51 wherein said selectively enabled receiver receives write data for entry into said memory device.

53. A memory device as in claim 51 wherein said selectively enabled receiver receives a data clock signal for entry into said memory device.

54. A memory device as in claim 51 wherein said first signal generator adjusts the timing of said first internal clock signal in accordance with changes in at least one parameter, and wherein the timing of said first receiver enable signal does not change with changes in timing of said first internal clock signal.

55. A memory device comprising:
a first signal generator which generates a first internal clock signal from a first external clock signal which has a frequency fc;
a second signal generator which generates a first control signal from an edge of said internal clock signal;
a third signal generator which generates N second clock signals from said first external clock signal, each of said N second clock signals having a frequency of fc/N and being phase shifted relative to each other, where N> 1;
a logic circuit for receiving said first control signal and which associates an edge of said first internal clock signal which generated said first control signal with one of said plurality of second clock signals which has a clock pulse which envelopes said edge and uses an edge of said clock pulse to generate a receiver enable signal.

56. A memory device as in claim 55 wherein said edge is a trailing edge of said clock pulse.

57. A memory device as in claim 55 further comprising a receiver in an input data path of said memory device which is enabled in response to generation of said receiver enable signal.

58. A memory device as in claim 57 wherein said receiver is in an input data clock path of said memory device.

59. A memory device as in claim 56 wherein said logic circuit associates said edge of said first internal clock signal by placing said edge at or near the center of said clock pulse of said one second clock signal.

60. A memory device as in claim 56 wherein said first signal generator adjusts the timing of said first internal clock signal in accordance with changes in at least one parameter.

61. A memory device as in claim 60 wherein said parameter is an operating voltage parameter.

62. A method as in claim 60 wherein said parameter is a temperature parameter.

63. A memory device as in claim 55 wherein said logic circuit comprises a first logic circuit which counts and identifies, with respective identification signals, transitions of said first internal clock signal, and which resets the counting and identification of transitions of said first internal clock signal when a predetermined signal relationship exists among said plurality of second clock signals.

64. A memory device as in claim 63 wherein said first logic circuit counts and identifies successive signal transitions of said first internal clock signal.

65. A memory device as in claim 63 wherein said first logic circuit counts and identifies transitions of said first internal clock signal until a predetermined number of transitions are counted and then resets and begins counting and identifying said transitions again.

66. A memory device as in claim 65 wherein said predetermined number is four.

67. A memory device as in claim 63 wherein said predetermined signal relationship occurs when a predetermined logic state exists in the signal levels of said plurality of second clock signals.

68. A memory device as in claim 63 wherein said logic circuit further comprises a second logic circuit which identifies the transition of said first internal clock signal which generated said control signal.

69. A memory device as in claim 68 wherein said second logic circuit comprises:
   a plurality of registers, each of which receives said first control signal and a respective identification signal from said first logic circuit;
   a multiplexer circuit coupled to the outputs of said registers, said multiplexer circuit being operative in response to a plurality of selection signals generated from said plurality of second clock signals to select a one of said register outputs which first receives said first control signal; and
   a latch circuit which is latched by a transition of said first external clock signal in response to a selected register output, said latch circuit providing said receiver enable signal.

70. A memory device as in claim 69 wherein said latch circuit is capable of latching on a positive or negative going edge of said first external clock signal, said selection signals determining which of said positive or negative going edge of said first external clock signal operates said latch circuit.

71. A memory device as in claim 69 wherein said logic circuit further comprises a third logic circuit responsive to said receiver enable signal for generating another receiver enable signal.

72. A memory device as in claim 71 wherein said receiver enable signal and said another receiver enable signal are not coextensive.

73. A memory device as in claim 69 further comprising a receiver in an input data path of said memory device which is enabled in response to generation of said receiver enable signal.

74. A memory device as in claim 73 wherein said receiver is in an input data path of said memory device.

75. A memory device as in claim 73 wherein said receiver is in an input data clock path of said memory device.

76. A memory device as in claim 72 further comprising first and second receivers arranged in respective input paths of said memory device, said first and second receivers being respectively enabled by said receiver enable signal and said another receiver enable device.

77. A memory device as in claim 76 wherein said first receiver is in an input data path of said memory device and said second receiver is in a data clock input path of said memory device.

78. A memory device as in claim 71 wherein said third logic circuit is responsive to a data clock signal to terminate generation of said another receiver enable signal.

79. A memory device as in claim 71 wherein said third logic circuit is enabled by said first control signal.

80. A processor system comprising:
   a processor; and
   a memory device coupled to said processor, said memory device comprising:
      a first signal generator which generates a first internal clock signal from a first external clock signal which has a frequency fc;
      a second signal generator which generates a first control signal from an edge of said internal clock signal;
      a third signal generator which generates N second clock signals from said first external clock signal, each of said N second clock signals having a frequency of fc/N and being phase shifted relative to each other, where N> 1; and
      a logic circuit which associates a plurality of successive edges of said first internal clock signal with a respective one of said N clock signals and determines which one of said N clock signals is associated with the clock edge of said first internal clock used to generate said first control signal, said logic circuit generating a first receiver enable signal from said determined one of said N clock signals and also from said first control signal.

81. A processor system as in claim 80 wherein N=4.

82. A processor system as in claim 80 further comprising a selectively enabled receiver for receiving an external clock signal, an enabling input of said receiver circuit being coupled to said first receiver enable signal.

83. A processor system as in claim 80 further comprising at least one selectively enabled receiver for receiving input data for said memory device, an enabling input of said receiver being coupled to said first receiver enable signal.

84. A processor system as in claim 82 wherein said logic circuit produces a second receiver enable signal from said first receiver enable signal, said memory device comprising at least one additional selectively enabled receiver for receiving input data for said memory device, an enabling input of said additional receiver being coupled to said second receiver enable signal.

85. A processor system as in claim 84 wherein said first and second enable signals are not coextensive in time.

86. A processor system as in claim 80 wherein said first signal generator adjusts the timing of said first internal clock signal in response to changes in at lest one predetermined parameter.

87. A processor system as in claim 86 wherein said logic circuit stably generates said first receiver enable signal and is unaffected by timing adjustments to said first internal clock signal.

88. A processor system as in claim 86 wherein said parameter is at least one operating voltage of said memory device.

89. A processor system as in claim 86 wherein said parameter is a temperature.

90. A processor system as in claim 80 wherein each of said N second clock signals is phase shifted from an adjacent one of said N second clock signals by one half of a period of said external clock signal.

91. A processor system as in claim 80 wherein said logic circuit generates said first receiver enable signal from an edge of said determined one of said N clock signals.

92. A processor system as in claim 80 wherein said logic circuit aligns each of successive edges of said first internal clock signal with a period of a pulse of a respective one of said N clock signals.

93. A processor system as in claim 92 wherein said logic circuit aligns each of successive edges of said first internal clock signal to be at or near the center of a pulse of a respective one of said N clock signals.

94. A processor system comprising:
   a processor; and
   a memory device coupled to said processor; said memory device comprising:
      a first signal generator which generates a first internal clock signal from a first external clock signal which has a frequency fc;
      a second signal generator which generates a first control signal from an edge of said internal clock signal;
      a third signal generator which generates N second clock signals from said first external clock signal, each of said N second clock signals having a frequency of fc/N and being phase shifted relative to each other, where N> 1;
      a logic circuit responsive to said first control signal, said first external clock signal, said first internal clock signal, and said N second clock signals for associating an edge of said internal clock signal which generated said first control signal with one of said N clock signals; and a selectively enabled receiver which is responsive to said first receiver enabling signal to permit signal input into said memory device.

95. A processor system as in claim 94 wherein said selectively enabled receiver receives write data for entry into said memory device.

96. A processor system as in claim 94 wherein said selectively enabled receiver receives a data clock signal for entry into said memory device.

97. A processor system as in claim 94 wherein said first signal generator adjusts the timing of said first internal clock signal in accordance with changes in at least one parameter, and wherein the timing of said first receiver enable signal does not change with changes in timing of said first internal clock signal.

98. A processor system comprising:

a processor; and a memory device coupled to said processor; said memory device comprising:

a first signal generator which generates a first internal clock signal from a first external clock signal which has a frequency fc;

a second signal generator which generates a first control signal from an edge of said internal clock signal;

a third signal generator which generates N second clock signals from said first external clock signal, each of said N second clock signals having a frequency of fc/N and being phase shifted relative to each other, where N> 1;

a logic circuit for receiving said first control signal and which associates an edge of said first internal clock signal which generated said first control signal with one of said plurality of second clock signals which has a clock pulse which envelopes said edge and uses an edge of said clock pulse to generate a receiver enable signal.

99. A processor system as in claim 98 wherein said edge is a trailing edge of said clock pulse.

100. A processor system as in claim 98 further comprising a receiver in an input data path of said memory device which is enabled in response to generation of said receiver enable signal.

101. A processor system as in claim 100 wherein said receiver is in an input data path of said memory device.

102. A processor system as in claim 100 wherein said receiver is in an input data clock path of said memory device.

103. A processor system as in claim 99 wherein said logic circuit associates said trailing edge of said first internal clock signal by placing said trailing edge at or near the center of said clock pulse of said one second clock signal.

104. A processor system as in claim 99 wherein said first signal generator adjusts the timing of said first internal clock signal in accordance with changes in at least one parameter.

105. A processor system as in claim 104 wherein said parameter is an operating voltage parameter.

106. A processor system as in claim 104 wherein said parameter is a temperature parameter.

107. A processor system as in claim 105 wherein said logic circuit comprises a first logic circuit which counts and identifies, with respective identification signals, transitions of said first internal clock signal, and which resets the counting and identification of transitions of said first internal clock signal when a predetermined signal relationship exists among said plurality of second clock signals.

108. A processor system as in claim 99 wherein said logic circuit counts and identifies successive signal transitions of said first internal clock signal.

109. A processor system as in claim 107 wherein said first logic circuit counts and identifies transitions of said first internal clock signal until a predetermined number of transitions are counted and then resets and begins counting and identifying said transitions again.

110. A processor system as in claim 109 wherein said predetermined number is four.

111. A processor system as in claim 107 wherein said predetermined signal relationship occurs when a predetermined logic state exists in the signal levels of said plurality of second clock signals.

112. A processor system as in claim 107 wherein said logic circuit further comprises a second logic circuit which identifies the transition of said first internal clock signal which generated said control signal.

113. A processor system as in claim 112 wherein said second logic circuit comprises:

a plurality of registers, each of which receives said first control signal and a respective identification signal from said first logic circuit;

a multiplexer circuit coupled to the outputs of said registers, said multiplexor circuit being operative in response to a plurality of selection signals generated from said plurality of second clock signals to select a one of said register outputs which first receives said first control signal; and a latch circuit which is latched by transitions of said first external clock signal in response to a selected register output, said latch circuit providing said receiver enable signal.

114. A processor system as in claim 113 wherein said latch circuit is configured to latch on a positive or negative going edge of said first external clock signal, said selection signals determining which of said positive or negative going edge of said first external clock signal operates said latch circuit.

115. A processor system as in claim 113 wherein said logic circuit further comprises a third logic circuit responsive to said receiver enable signal for generating another receiver enable signal.

116. A processor system as in claim 115 wherein said receiver enable signal and said another receiver enable signal are not coextensive.

117. A processor system as in claim 113 further comprising a receiver in an input data path of said memory device which is enabled in response to generation of said receiver enable signal.

118. A processor system as in claim 101 wherein said receiver is in an input data path of said memory device.

119. A processor system as in claim 102 wherein said receiver is in an input data clock path of said memory device.

120. A processor system as in claim 116 further comprising first and second receivers arranged in respective input paths of said memory device, said first and second receivers being respectively enabled by said receiver enable signal and said another receiver enable device.

121. A processor system as in claim 120 wherein said first receiver is in an input data path of said memory device and said second receiver is in a data clock input path of said memory device.

122. A processor system as in claim 115 wherein said third logic circuit is responsive to a data clock signal to terminate generation of said another receiver enable signal.

123. A processor system as in claim 115 wherein said third logic circuit is enabled by said first control signal.

* * * * *